United States Patent [19]

Santa

[11] Patent Number: 5,564,911
[45] Date of Patent: Oct. 15, 1996

[54] PUMP, CONTROL VALVE AND DIAPHRAGM

[75] Inventor: Joseph L. Santa, Belmont, Australia

[73] Assignee: Joe Santa & Associates Pty Limited, Newcastle, Australia

[21] Appl. No.: 295,710

[22] PCT Filed: Mar. 3, 1993

[86] PCT No.: PCT/AU93/00086

§ 371 Date: Nov. 3, 1994

§ 102(e) Date: Nov. 3, 1994

[87] PCT Pub. No.: WO93/18305

PCT Pub. Date: Sep. 16, 1993

[30] Foreign Application Priority Data

| Mar. 5, 1992 | [AU] | Australia | PL1208 |
| Sep. 7, 1992 | [AU] | Australia | PL4540 |
| Oct. 30, 1992 | [AU] | Australia | PL5604 |

[51] Int. Cl.$^6$ .................................. F04B 43/06
[52] U.S. Cl. ............... 417/395; 417/393; 417/566; 92/104; 251/297
[58] Field of Search .................. 417/393, 394, 417/395, 566, 571; 251/297; 92/104

[56] References Cited

U.S. PATENT DOCUMENTS

| 3,072,149 | 1/1963 | Hasbany . | |
| 3,174,500 | 3/1965 | Johnson . | |
| 3,735,781 | 5/1973 | Kesti | 251/297 |
| 3,860,034 | 1/1975 | Rupp . | |
| 4,237,775 | 12/1980 | Eisele | 92/104 |
| 4,381,180 | 4/1983 | Sell | 417/393 |
| 4,521,165 | 6/1985 | Handleman | 417/393 |
| 4,895,494 | 1/1990 | Gardner | 417/393 |
| 5,180,270 | 4/1992 | Kozumplik, Jr. | 417/393 |

FOREIGN PATENT DOCUMENTS

| 8204275 | 12/1976 | Australia . | |
| 7507881 | 2/1982 | Australia . | |
| 8178882 | 5/1983 | Australia . | |
| 104847 | 9/1983 | European Pat. Off. . | |
| 267041 | 11/1987 | European Pat. Off. . | |
| 378947 | 12/1989 | European Pat. Off. . | |
| 1187703 | 9/1959 | France . | |
| 735994 | 4/1943 | Germany | 92/104 |
| 4116410 | 5/1991 | Germany . | |
| 9102161 | 2/1991 | WIPO . | |

OTHER PUBLICATIONS

PCT search report, PCT/AU93/00086 Jun. 1993.

Primary Examiner—Charles G. Freay
Attorney, Agent, or Firm—Watts, Hoffmann, Fisher & Heinke Co., L.P.A.

[57] ABSTRACT

A double acting, fluid actuated pump is disclosed. The pump includes a pair of diaphragms interconnected by a piston. Each diaphragm is formed of resilient material and comprises a central portion for attachment to the piston, a peripheral portion for attachment to a surrounding housing and an intermediate conical portion extending between the central portion and the peripheral portion. A first hinge merges the intermediate portion with the central portion. A second hinge merges the intermediate portion with the peripheral portion. Each hinge comprises an annular protuberance extending out of an extension of the cone of the intermediate portion such that a portion of the first hinge and a corresponding portion of the second hinge project from opposite sides of the cone to provide a reliable, fatigue resistant, diaphragm. Valving for the pump is also disclosed.

9 Claims, 5 Drawing Sheets

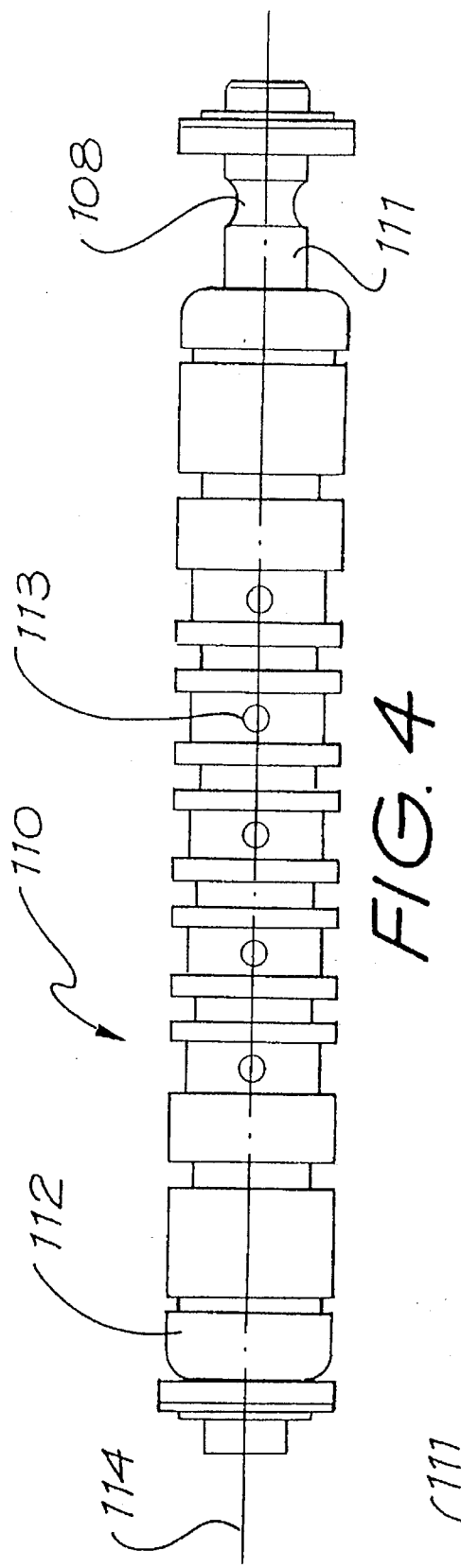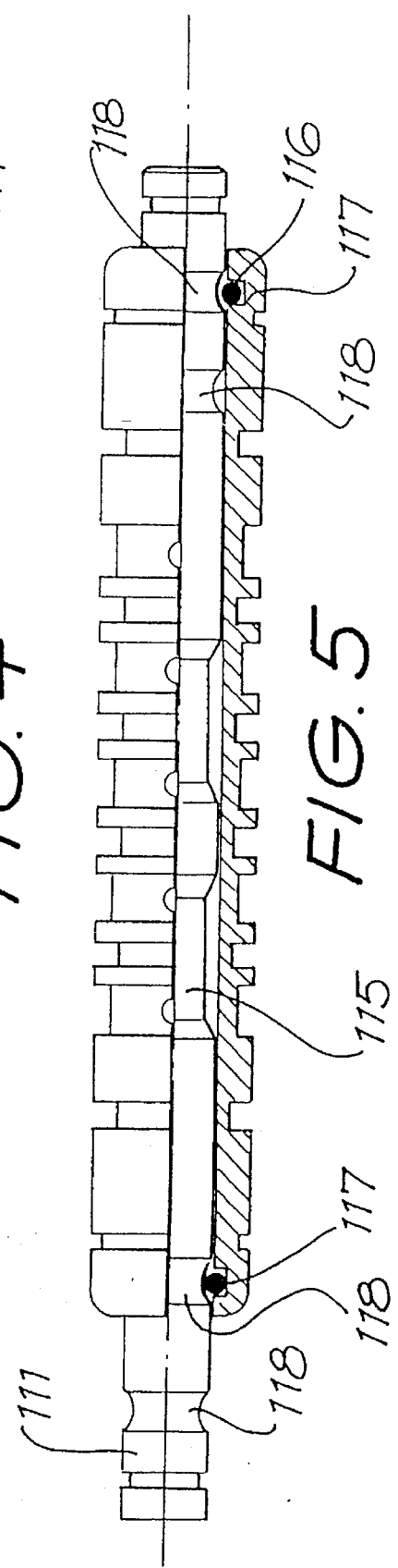

PUMP, CONTROL VALVE AND DIAPHRAGM

BACKGROUND OF THE PRESENT INVENTION

The present invention relates to pumps and more particularly but not exclusively to air operated pumps to move liquid, including liquid having suspended solids (sludge).

The invention also pertains to a control valve and more particularly to a control valve in which the conventional ball and spring detent mechanism is replaced with a polymeric O-ring or rings.

The invention also relates to diaphragms employed in air operated pumps to move liquid.

BACKGROUND OF THE INVENTION

Compressed air operated pumps are known to consist of reciprocating dual diaphragms located within a metal pump body. The pump chambers are serviced by cast metal manifolds. The overall weight of these previously known pumps is considerable which is of a major disadvantage where the unit must be manhandled. This problem is exacerbated in cramped areas such as mines.

Control valves such as spindle valves often include a positive locating device or detent mechanism. The locating device or detent mechanism positively orients the shaft or spindle of the valve with respect to the sleeve or valve body. Prior art spindle valves tended to jam because the steel balls of the detent mechanisms were susceptible to wear, the wear pattern increasing the likelihood of jamming between the shaft and the sleeve or body of the valve.

Compressed air operated pumps are known to consist of reciprocating dual diaphragms located within a metal pump body. The pump chambers are serviced by manifolds. For example, such a pump is described in U.S.. Pat. No. 4,238,992.

The pump described in the abovementioned USA patent suffers from the disadvantage that the diaphragms fail at an unacceptably low number of cycles.

OBJECT OF THE INVENTION

It is the object of the present invention to overcome or substantially ameliorate at least one of the above disadvantages.

SUMMARY OF THE INVENTION

There is disclosed herein a pump comprising:
a pump body formed of plastics material and providing a pair of opposing pump chambers;
a pair of flexible pump diaphragms mounted in the pump body, each diaphragm being associated with a respective pump chamber so as to divide its pump chamber into a pumped fluid sub-chamber and a working fluid sub-chamber;
connecting rod means coupling the diaphragms so that they reciprocate in unison to vary the volume of the sub-chambers upon the flow of working fluid to or from the working fluid sub-chambers;
valve means to co-ordinate the delivery of working fluid under pressure to the working fluid sub-chambers to cause reciprocation of the diaphragms;
a pair of first one-way valves, each associated with a respective pumped fluid sub-chamber permitting delivery of fluid to its associated pump chamber;
a pair of second one-way valves, each associated with a respective pumped fluid sub-chamber permitting the fluid to be pumped to flow from the respective sub-chamber; and
a pair of manifolds, each manifold being associated with a respective pumped fluid sub-chamber, each manifold being of a unitary construction of plastics material and having a first duct communicating with the associated first valve, and a second duct associated with the respective second valve of the associated pumped fluid sub-chamber.

There is further disclosed herein a spindle valve comprising a spindle shaft which slides within a cylindrical body, the body having a plurality of ports which cooperate with machined portions of the spindle shaft, the shaft also comprising two or more locating grooves, the body including at least one internal groove in which is located an O-ring. The O-ring allows the spindle shaft to slide axially and rotate within the spindle body. When the O-ring is situated around one of the locating grooves on the spindle shaft, interference between the O-ring and the shaft axially stabilizes the spindle shaft until such a time as the axial position of the shaft is changed by the application of some external force.

There is further disclosed herein a pump diaphragm formed of resilient material and comprising:
a central portion for attachment to a piston;
a peripheral portion for attachment to a housing generally surrounding the piston;
an intermediate portion joining the central portion and peripheral portion; and
hinge means joining the intermediate portion with the central portion and/or the peripheral portion.

Preferably, the central portion is of a circular configuration and the peripheral portion is of an annular configuration. The hinge means includes two annular hinge portions, a first one of the hinge portions connecting the intermediate portion with the peripheral portion, and the other hinge portion connecting the central portion and the intermediate portion.

Preferably, the hinge means serves to reduce deformation-generated heat stress.

BRIEF DESCRIPTION OF THE DRAWINGS

Preferred forms of the present invention will now be described by way of example with reference to the accompanying drawings wherein

FIG. 4 is a plan view of a spindle valve according to the teachings of the present invention;

FIG. 5 is a plan view of the spindle valve depicted in FIG. 4, partially cross sectioned to show the location of the internal groove, O-ring and locating grooves;

DETAILED DESCRIPTION OF THE PREFERRED EMBODIMENTS

Figure 1:
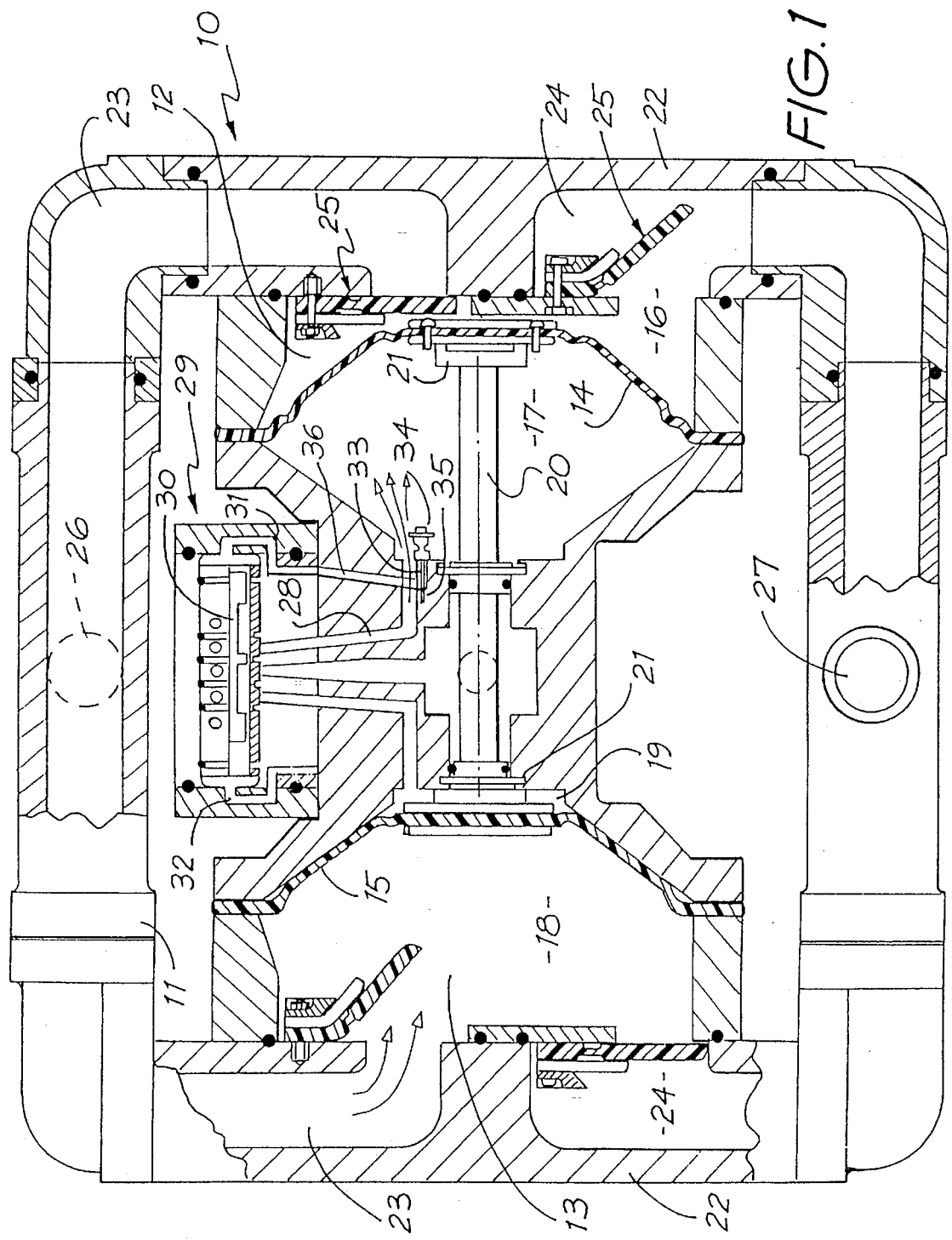
FIG. 1 is a schematic part sectioned view of a pump operated by air under pressure.
Figure 2:
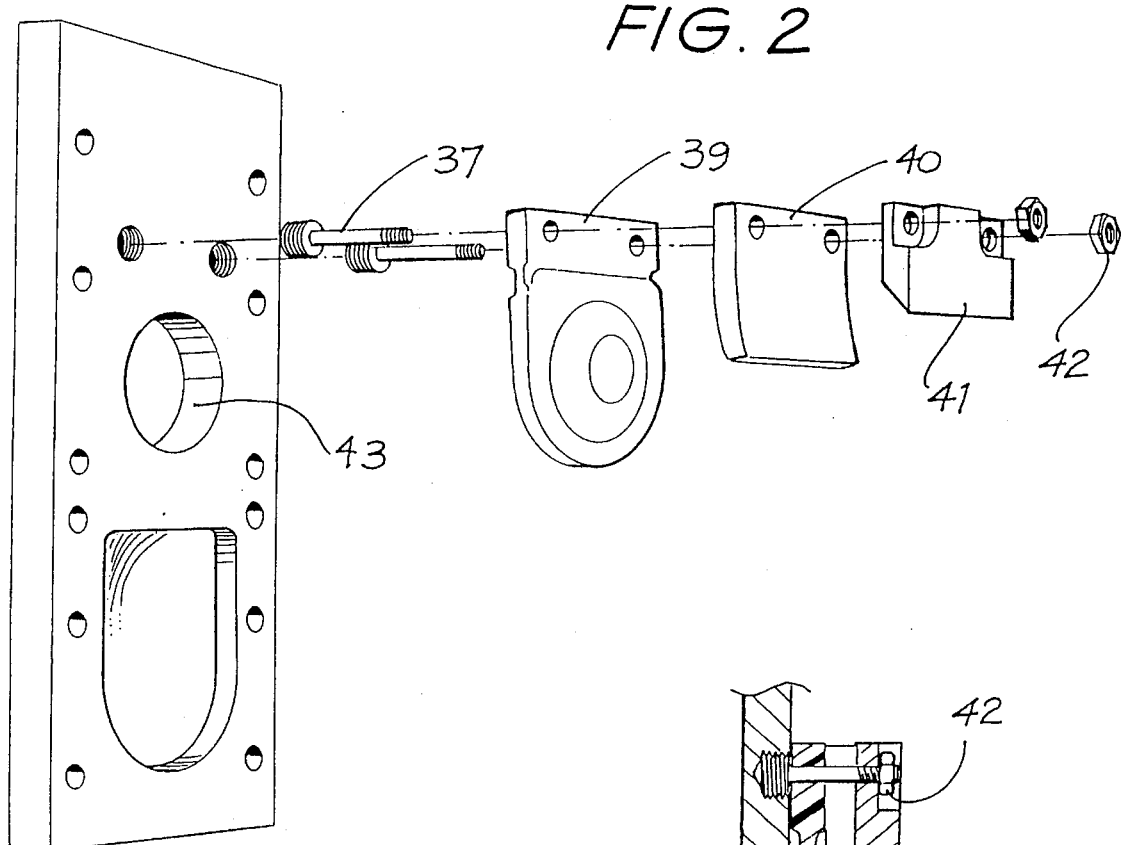
FIG. 2 is a parts exploded perspective view of the valve employed in the pump of FIG. 1.
Figure 3:
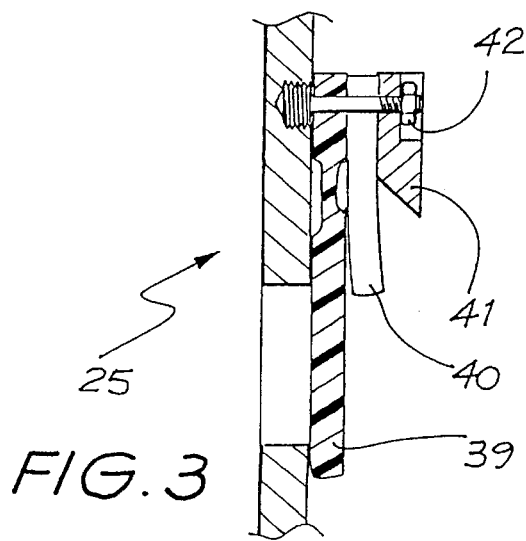
FIG. 3 is a schematic assembly of the valve of FIG. 2, inside elevation.

In FIGS. 1 to 3 of the accompanying drawings there is schematically depicted a pump 10 which uses compressed air as a working gas to pump liquids such as sludge.

The pump 10 has a pump body 11 which at least partly encloses a pair of opposing pump chambers 12 and 13. Mounted in the body 11 are a pair of flexible diaphragms 14 and 15 which divide their respective chambers 12 and 13 into sub-chambers 16 and 17 and 18 and 19. The chambers 16 to 19 are effectively closed apart from openings which permit the flow of a working fluid and a liquid being pumped.

Extending between the diaphragms 14 and 15 is a connecting rod 20 which is connected to each diaphragm 14 and 15 by a flange assembly 21.

Located at each longitudinal end of the pump 10 are manifolds 22 which each provide an inlet duct 23 and an outlet duct 24 for the sub-chambers 16 and 18. Each duct 22 and 23 has an associated valve assembly 25 which restricts movement of the pumped liquid in one direction through the pump 10. For example, each outlet duct 24 has an associated valve assembly 25 which prevents reverse movement of the pumped liquid back into the associated chamber 16 or 18. Similarly the inlet ducts 23 each have an associated valve assembly 25 which permits liquid to enter the sub-chambers 16 and 18 but prevents pumped liquid flowing in the reverse direction with respect to the inlet ducts 23.

Each inlet duct 23 communicates with a primary inlet 26 while each outlet duct 24 communicates with a primary outlet 27.

Extending from each sub-chamber 17 and 19 is a working fluid duct 28 which provides for the passage of compressed air to and from the sub-chambers 17 and 19. The ducts 28 extend to a spool valve assembly 29 which co-ordinates the delivery of compressed air and the exhaust of air from the sub-chambers 17 and 19 so that the diaphragms 14 and 15 are caused to reciprocate to vary the volume of the sub-chambers 16 and 19 to move pumped liquid through the pump 10.

The spool valve assembly 29 includes a spool 30 which reciprocates longitudinally of its axis to alternatively connect each duct 29 with a source of pressurised air, or alternatively an exhaust. The spool 30 is caused to reciprocate by the delivery of compressed air, via passages 31 and 32 to the ends of the spool 30. Each passage 31 and 32 communicates with a valve assembly 33. It should be appreciated that there is a valve assembly 33 associated with each sub-chamber 17 and 19. Each valve assembly 33 includes an actuator 34 which is engaged by the diaphragm 14 and/or flange assembly 21 to move a valve stem 35. The valve stem 35 extends between both valve assemblies 33 so as to be coupled to each actuator 34. The valve assembly 33 operatively opens or closes the associated passages 36 to deliver compressed air to the passages 31 and 32, or alternatively connect them to an exhaust. Since the actuators 34 are connected, the delivery and exhaust of the compressed air with respect to the passages 31 and 32 is co-ordinated so that the diaphragms 14 and 15 are reciprocated.

Each valve assembly 25 includes a hinge plate 39 and a valve stop 40. The assembly also includes a hinge plate 41 and nuts 42 to cooperate with screw inserts 37. The hinge plate 41 secures the valve stop 40 and hinge valve 39 in position. Under the influence of pressure, the hinge valve 39 pivots to expose or to close the valve opening 43. An "O-ring" may be provided for good sealing contact.

The above described pump 10 has its larger items manufactured from plastics material, preferably nylon. To permit construction of the pump 10 of nylon, it has been discovered that the manifolds 22 need to be of a unitary construction of nylon. Preferably the other major items of the pump such as the pump body 11 are also manufactured of nylon.

As shown in FIG. 4, a spindle valve 110 comprises a spindle shaft 111 and a valve body or sleeve 112. The valve body has a series of ports 113 located along a longitudinal axis 114.

As shown in FIG. 5, the spindle shaft 111 further comprises wide circumferential machined portions or grooves 115 which, according to their axial position within the sleeve 112, determine which ports 113 are in fluid communication.

In operation, the axial position of the spindle shaft 111 is changed between two or more positions, thus providing at least two flow characteristics for the valve. The axial position of the spindle shaft 111 should remain stable until it is acted upon by an external force. In prior art devices, this axial stability was provided by a steel ball located within a radial bore in the spindle body or sleeve 112. The ball was urged toward the spindle shaft 111 by a spring.

In the present invention, the spring and ball detent mechanism is replaced by O-rings 116. The O-rings 116 rest within respective grooves 117 which are formed into the internal diameter of the valve body 112. Thus, the O-rings 116 protrude into the central bore of the valve body 112.

The spindle shaft 111 is fabricated to include at least two circumferential locating grooves 118 at each end of the shaft. The circumferential grooves 118 are preferably radiused so that they present no sharp corners to the O-rings 116 when the groove 118 is located within the respective O-ring 116. Thus, the spindle shaft 111 will remain in a particular axial position until it is acted upon by an external force.

It has been found that the use of an O-ring, particularly a neoprene O-ring is particularly wear resistant and provides a positive locating of the spindle shaft 111 with respect to the valve body 112. When the spindle shaft 111 is changed from one position to another (as illustrated in FIGS. 4 and 5) the O-rings compress until once again located within one of the locating grooves 118.

Figure 6:
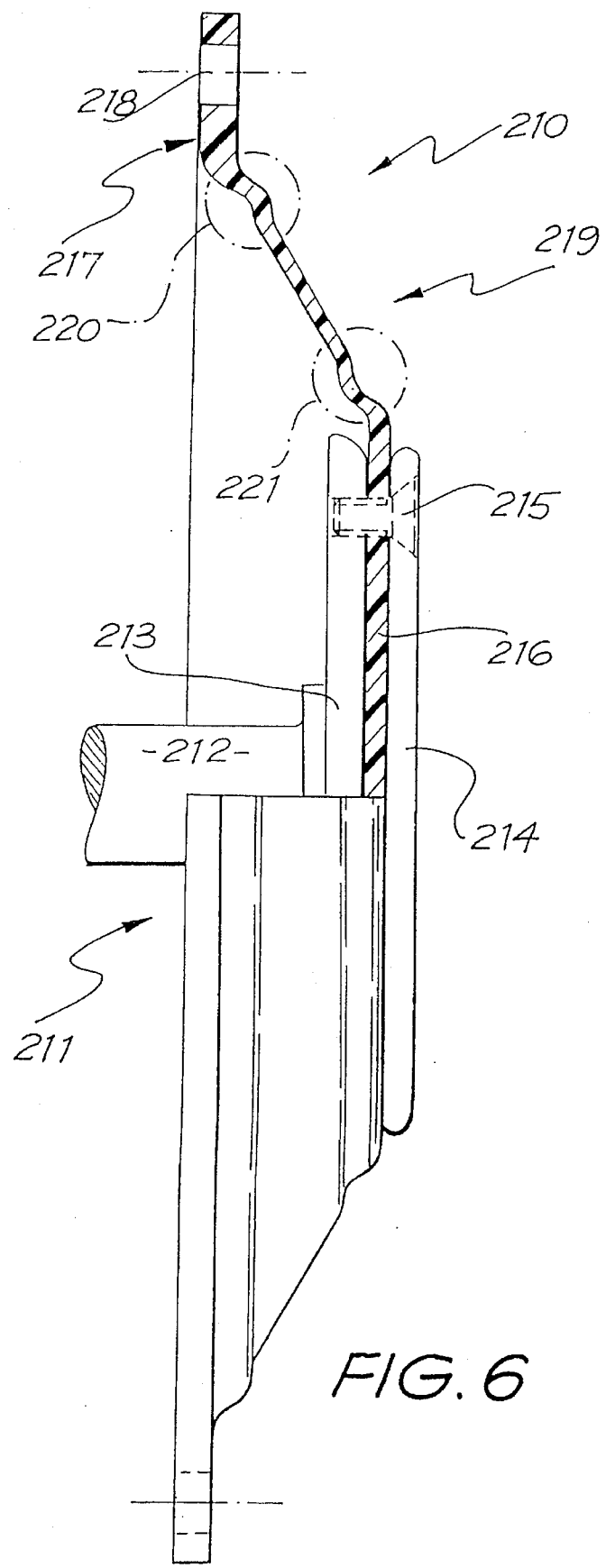
FIG. 6 is a schematic part sectioned side elevation of a pump diaphragm and pump piston.
Figure 7:
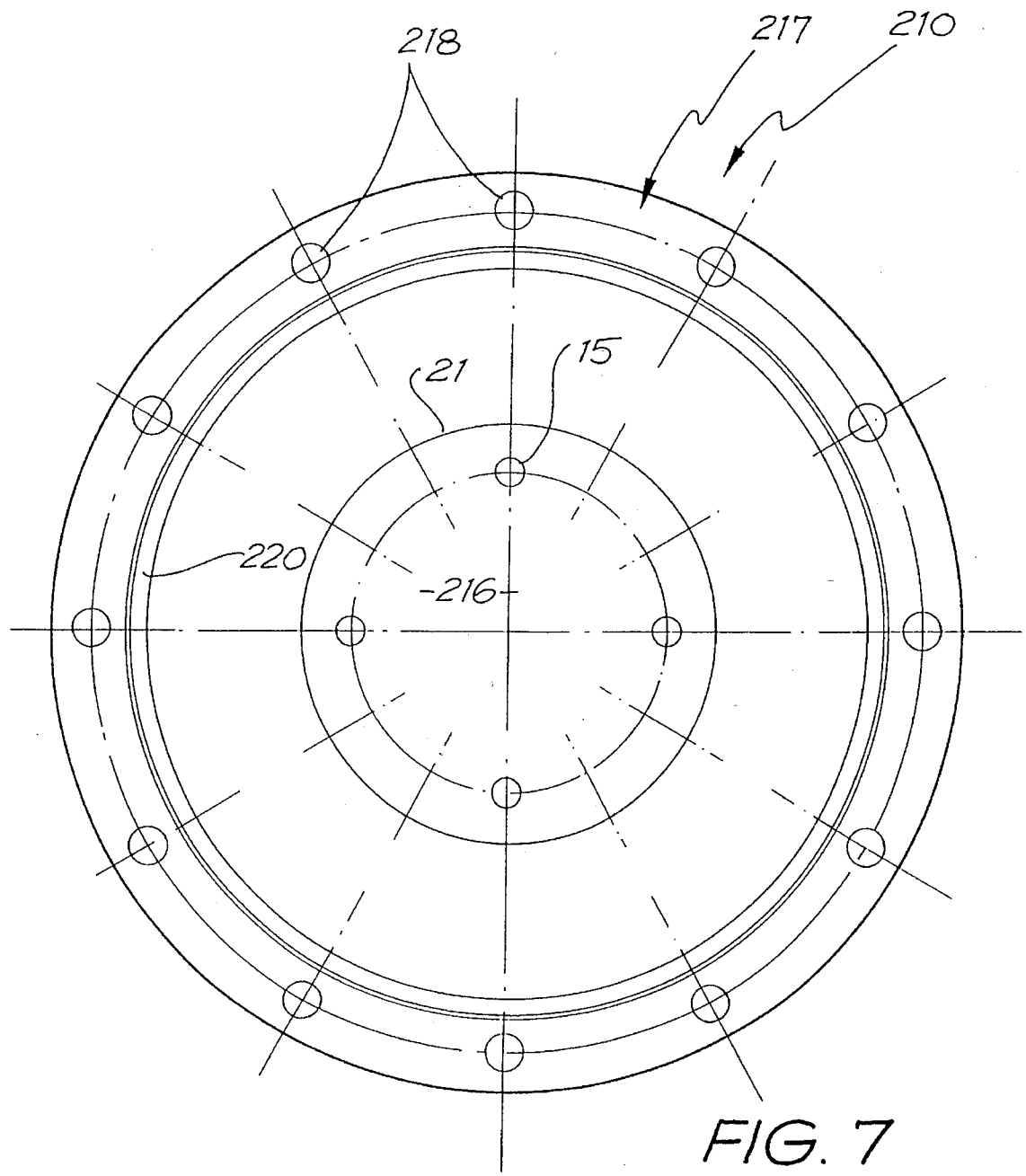
FIG. 7 is a schematic plan view of the diaphragm of FIG. 6.

In FIGS. 6 and 7 of the accompanying drawings there is schematically depicted a pump diaphragm 210 coupled to a pump piston assembly 211. The diaphragm 210 is formed of flexible material such as plastics or rubber (natural or synthetic). The piston assembly 211 includes a shaft 212 terminating with a flange 213. The flange 213 cooperates with a disc 214, via threaded fasteners 215, to securely engage a central circular portion 216 of the diaphragm 210. The annular peripheral portion 217 of the diaphragm 210 is fixed to the pump housing, via apertures 218. The peripheral portion 217 is stationary and the pump assembly 211 is reciprocated thereby causing flexing of the intermediate portion 219 of the diaphragm 210.

Connecting the intermediate portion to the central portion 216 and peripheral portion 217 are resilient hinges 220 and 221.

The above discussed hinges 220 and 221 are of an annular configuration and permit the diaphragm 210 to be formed of a more inflexible material which is more tolerant to the stresses to which the diaphragm 210 is subjected. For example, the diaphragm can be made from a synthetic resin polymer sold under the registered trademark Nytrol. The hinges 220 and 221 also permit a thinner diaphragm to be used which again reduces the bending stresses within the diaphragm 210.

I claim:

1. A pump diaphragm formed of resilient material and comprising:

a central portion for attachment to a piston;

a peripheral portion for attachment to a housing generally surrounding the piston;

an intermediate portion having a frusto-conical surface, the intermediate portion extending between the central portion and the peripheral portion; and first hinge means merging the intermediate portion with the central portion and second hinge means merging the intermediate portion with the peripheral portion, each hinge means comprising an annular protuberance extending out of an imaginary extension of the frusto-conical surface, wherein the first hinge means and second hinge means project from opposite sides of the imaginary extension of the conical surface.

2. The pump diaphragm of claim 1 wherein the central portion is adapted to be fixed between a pair of essentially flat plates attached to a piston and wherein the first hinge means is located on the diaphragm to be spaced away from the plates so as not to engage with either plate.

3. The pump diaphragm of claim 1 wherein the peripheral portion is adapted to be fixed between facing surfaces of a pump housing and wherein the second hinge means is located on the diaphragm to be spaced away from such housing so as not to engage such pump housing.

4. A pump comprising:

a pump body providing a pair of opposing pump chambers;

a pair of flexible pump diaphragms as defined in claim 1 mounted in the pump body, each diaphragm being associated with a respective pump chamber so as to divide its pump chamber into a pumped fluid sub-chamber and a working fluid sub-chamber;

connecting rod means coupling the diaphragms so that they reciprocate in unison to vary the volume of the sub-chambers upon the flow of working fluid to or from the working fluid sub-chambers;

valve means to co-ordinate the delivery of working fluid under pressure to the working fluid sub-chambers to cause reciprocation of the diaphragms;

a pair of first one-way valves, each associated with a respective pumped fluid sub-chamber permitting delivery of fluid to its associated pump chamber;

a pair of second one-way valves, each associated with a respective pumped fluid sub-chamber permitting the fluid to be pumped to flow from the respective sub-chamber; and a pair of manifolds, each manifold being associated with a respective pumped fluid sub-chamber, each manifold being of a unitary construction of plastics material and having a first duct communicating with the associated first valve, and a second duct associated with the respective second valve of the associated pumped fluid sub-chamber.

5. The pump of claim 4 wherein the pump body is formed of plastics material.

6. The pump of claim 4 wherein each of said first and second one-way valves comprises hinge plate means to selectively cover/uncover an associated valve opening.

7. The pump of claim 4 wherein said valve means to co-ordinate the delivery of working fluid under pressure comprises a spool valve which reciprocates longitudinally of its axis.

8. The pump of claim 4 wherein the valve means comprises a spindle shaft which slides within a cylindrical body, the body having a plurality of ports which cooperate with machined portions of the spindle shaft, the shaft also comprising two or more locating grooves, the body including at least one internal groove in which is located an O-ring.

9. The pump of claim 8 wherein two or more locating grooves are located at respective ends of the shaft, and wherein the body includes at least one said internal groove at each end thereof.

* * * * *